United States Patent [19]

Wright

[11] 4,407,046

[45] Oct. 4, 1983

[54] POULTRY CUTTING APPARATUS

[75] Inventor: Stanley Wright, Cherry Hill, N.J.

[73] Assignee: Precision Automation Co., Inc., Cherry Hill, N.J.

[21] Appl. No.: 321,438

[22] Filed: Nov. 16, 1981

[51] Int. Cl.³ ............................................ A22C 21/00
[52] U.S. Cl. ................................................... 17/11
[58] Field of Search .................................... 17/11, 52

[56] References Cited

U.S. PATENT DOCUMENTS 3,624,863  12/1971  Gasbarro .............................. 17/11
3,946,461  3/1976  Martin .................................. 17/11
4,067,085  1/1978  Gasbarro .............................. 17/11

Primary Examiner—Willie G. Abercrombie
Attorney, Agent, or Firm—Robert K. Youtie

[57] ABSTRACT

An apparatus for cutting poultry including a carcass carrying mandrel shiftable into and out of a carcass loading position, a clamp movable toward and away from the mandrel for clamping and releasing a carcass on the mandrel and movable with the mandrel in its clamping condition, and cutters for cutting the carcass on the mandrel at different positions of mandrel movement.

9 Claims, 9 Drawing Figures

POULTRY CUTTING APPARATUS

BACKGROUND OF THE INVENTION

As is well known in the poultry processing field, there have been provided a number of poultry carcass cutting machines. However, prior cutting machines have not been sufficiently economical, reliable, or otherwise satisfactory to effectively eliminate hand cutting. Applicant is aware of the prior art disclosed in the below listed prior patents:

| U.S. PAT. NO. | PATENTEE |
| --- | --- |
| 2,941,238 | Reeves |
| 3,177,520 | Vogt et al |
| 3,564,644 | Cannon |
| 3,624,863 | Gasbarro |
| 3,639,945 | Duncan et al |
| 3,816,874 | Jahnke |
| 3,943,600 | Cramer |
| 3,946,461 | Martin |
| 3,950,820 | Duncan et al |
| 4,016,624 | Martin et al |
| 4,019,223 | Baker |
| 4,067,085 | Gasbarro |
| 4,083,083 | Duncan et al |
| 4,184,229 | Soran |
| 4,214,345 | Duncan et al |
| 4,251,901 | Thomas et al |

The closest prior art is probably that of U.S. Pat. Nos. 3,624,863 and 4,067,085 to Gasbarro. However, there is absent from the prior art any suggestion of applicant's unique carcass clamp and its advantageous relationship with the mandrel and leg pullers, as well as applicant's unique shear action cutter blades and their improved cooperation with the mandrel.

SUMMARY OF THE INVENTION

It is an important object of the present invention to provide a poultry cutter of the type described which is extremely rapid and reliable in production, occupies a minimum of space and requires a minimum of manual operation, which is entirely safe, and readily capable of quick and easy blade changes for wide versatility in operation.

Other objects of the present invention will become apparent upon reading the following specification and referring to the accompanying drawings, which form a material part of this disclosure.

The invention accordingly consists in the features of construction, combinations of elements, and arrangements of parts, which will be exemplified in the construction hereinafter described, and of which the scope will be indicated by the appended claims.

DESCRIPTION OF THE PREFERRED EMBODIMENT

Figure 1:
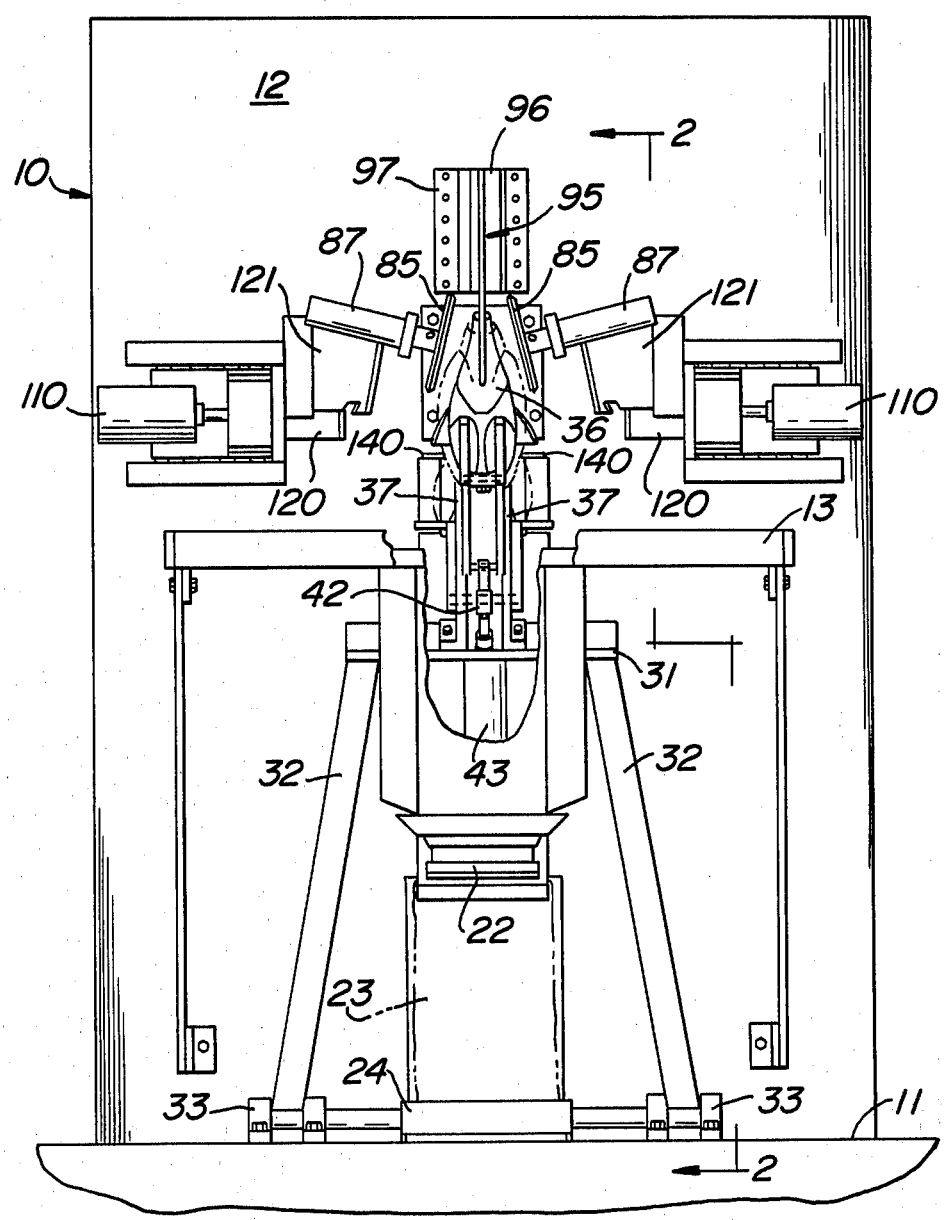
FIG. 1 is a front elevational view showing a poultry cutting apparatus of the present invention, with parts broken away for clarity of understanding.
Figure 2:
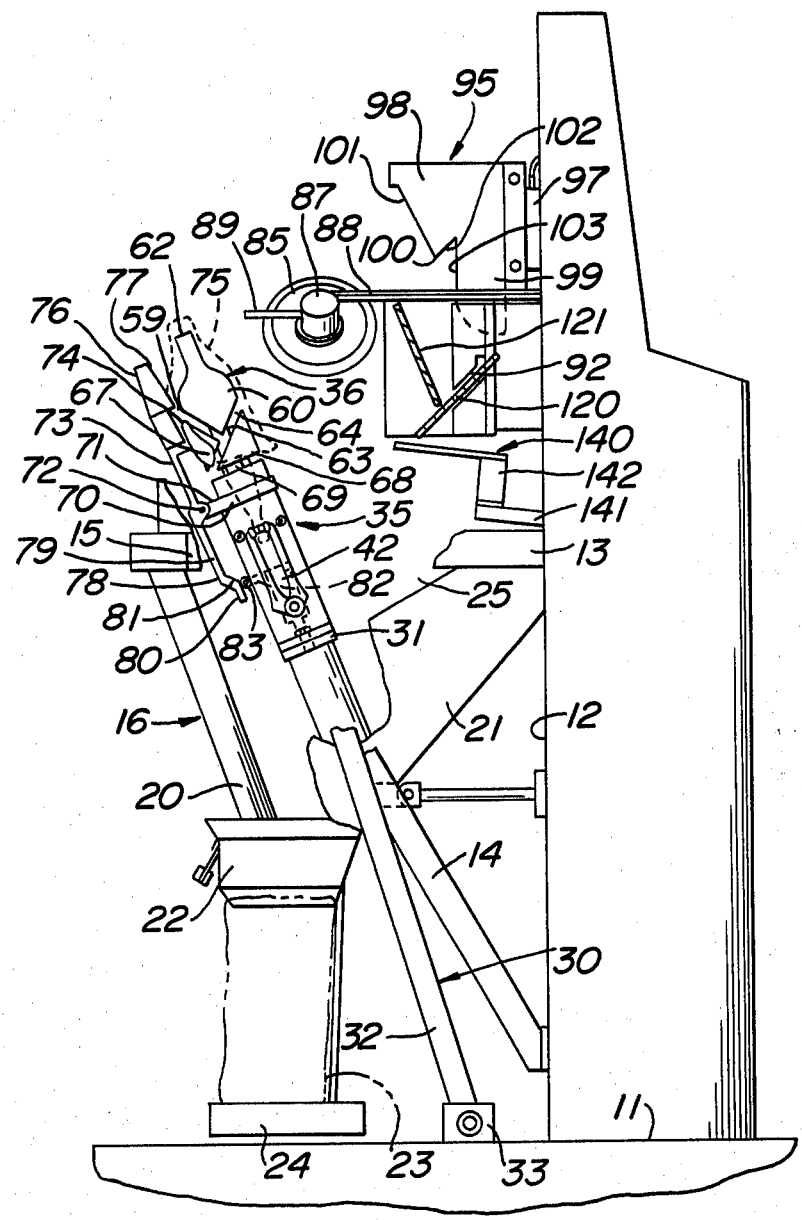
FIG. 2 is a sectional elevational view taken generally along the line 2—2 of FIG. 1, with parts broken away for clarity.

Referring now more particularly to the drawings, and specifically to FIGS. 1 and 2 thereof, the apparatus is generally designated 10, and includes a base 11 and back wall 12 upstanding from the base. A generally horizontal support, frame or table 13 may extend forwardly from the rear wall 12, and may be suitably supported in position by braces 14 declining rearwardly from the support frame to the rear wall. The table or frame 13 may be centrally open, as at 15, and provided beneath its central opening with a chute 16 for gravitationally passing cut chicken parts downwardly, as will appear more fully hereinafter.

The chute 16 may include a forward deflector part or chute section 20 declining rearwardly from the underside of support frame 13, and a rear deflector or chute section 21 declining forwardly from the rear region of the support frame 13 to the lower region of forward chute section 20. The forward and rearward chute sections 20 and 21 converge downwardly toward a collector or hopper 22 which receives cut chicken parts and supports an open receptacle or bag 23 for delivering the parts to the bag.

The bag 23 which is open beneath the hopper 22 may be supported on a trap door 24, or other suitable removal means so that a filled bag may be gravitationally or otherwise conveyed away for replacement by an empty bag. Any conventional bag supply and bag opening means (not shown) may be associated with the hopper 22 and trap door 24 and operated in properly timed relation with the poultry cutter of the present invention.

Figure 5:
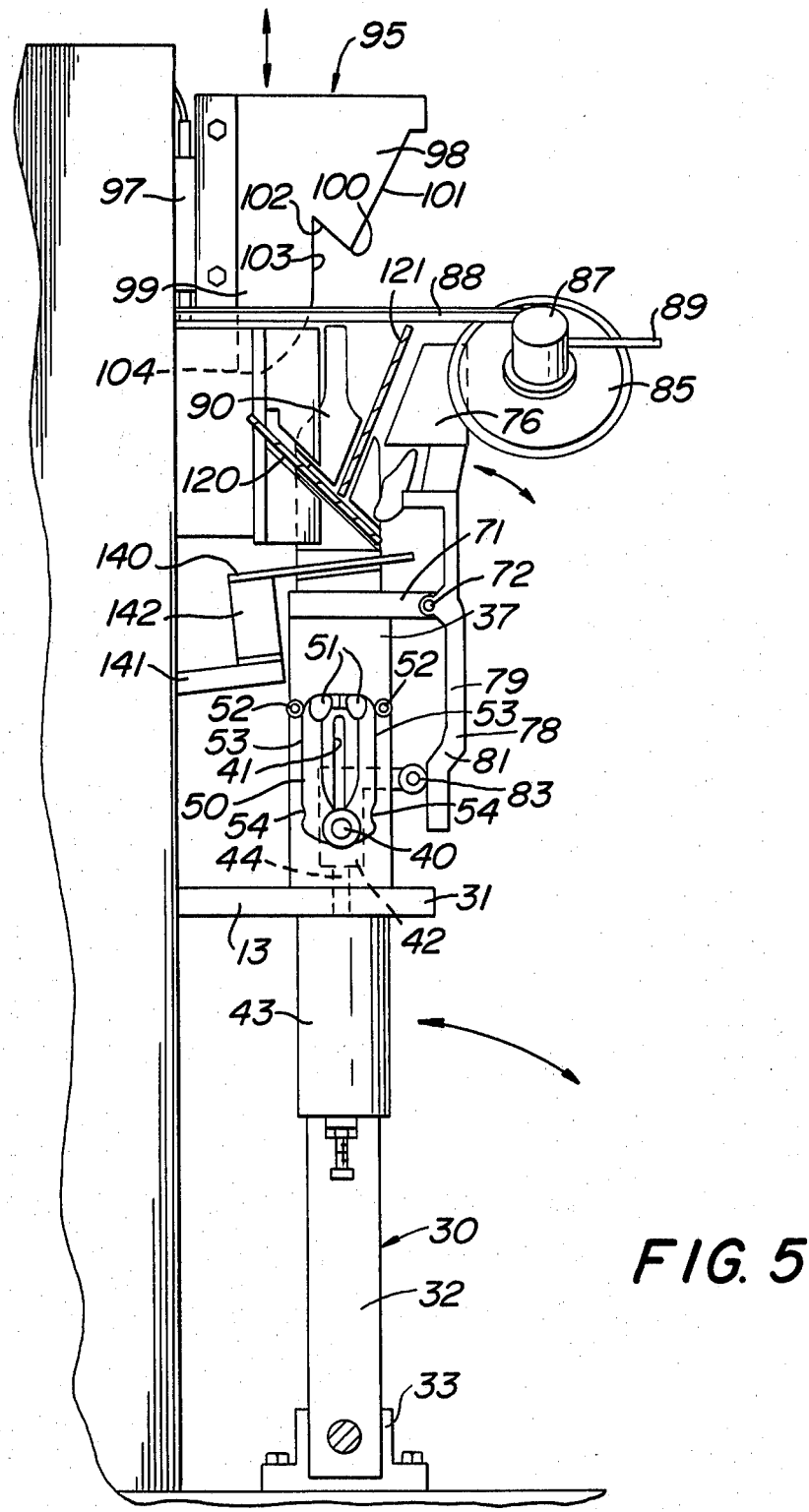
FIG. 5 is a side elevational view similar to FIG. 2, but with a mandrel shifted rearwardly.

As best seen in FIG. 2, there is a laterally extending through opening 25 beneath the generally horizontal support frame 13 and between the upper regions of the downwardly converging front and rear chute sections 20 and 21. A swinging gantry or bridging carrier 30 includes an upper, bridging member or plate 31 extending laterally through the opening 25 on the underside of support frame 13, and a pair of diverging legs or struts 32 depending from opposite ends of the plate 31 and laterally outwardly therefrom to journal mounts 33 coaxially aligned with each other generally parallel to the carrier member 31 and suitably fixed, as on the base 11. Thus, the gantry or carrier 30 is swingable about the axes of journals 33 to shift the mounting member 31 forwardly and rearwardly in the opening 25, as between the forward and rearward positions of FIGS. 2 and 5, respectively.

Carried on the upper end of the carrier frame or gantry 30, being fixed on the upper side of the upper member 31 and upstanding therefrom, is an upstanding mandrel support structure 35, on the upper end of which is fixed an upstanding mandrel 36. The mandrel support structure may include a pair of laterally spaced, substantially rigid legs 37 upstanding from the bridging carrier member 31 and suitably fixed thereto, as by fastener or securement means 38.

A cross pin or lateral pintle 40 extends laterally across the space between upstanding members 37, having its opposite ends extending outwardly through and beyond respective upstanding members, being slidably received in longitudinal guide slots 41 formed in respective upstanding members. A cross head 42 may be carried on the pin 40, spaced between the upstanding members 37, for movement of the cross head longitudinally of the upstanding frame members as constrained by the pin 40 in the slots 41.

An actuating piston-and-cylinder assembly 43 may be fixed on the underside of lateral carrier plate 31, including a piston rod 44 fixed at its upper end to the cross head 42 for effecting reciprocation of the latter.

On the outer side of each upstanding frame member 37 are a cooperating pair of leg gripping arms 50, each pair having its lower ends pivoted to the adjacent end of pin 40 and extending upwardly in generally parallism with each other to terminate in facing jaws 51. Mounted on the outer side of each upstanding member 37, adjacent to and outwardly of each leg gripping arm is a camming roller 52, see FIG. 5. The leg gripping arms 50 are movable up and down along the supporting upstanding members 37, as by longitudinal movement of cross head 42 and pin 40 along slot 41; and the camming rollers 52 simultaneously roll along the outer, nonfacing surfaces 53 of the arms 50. The leg gripping arms 50 having their outer surfaces 53 configured to cause closing of the jaws 51 toward each other upon downward movement or retraction of the cross head 42 and arms, while permitting of opening arm movement or swinging away from each other upon upward shifting of the cross head 42. More specifically, the outer arm surfaces 52 may be recessed, as at 54 for rolling engagement with the rollers 52 upon upward or outward extension of the gripping arms 50 to release the latter for opening outward movement away from each other.

Extending longitudinally outwardly or upwardly from the upper end of the mandrel support structure 35, and rigidly secured thereto by any suitable means, is the mandrel 36 having a relatively large body portion 60, tapering upwardly by a reduced portion 61, and an upper end reduced portion 62. On the forward side of the mandrel, formed in the mandrel body portion 16 is a keel or breast slot 59, which extends generally rearwardly and downwardly, while opening laterally through the mandrel, as best seen in FIG. 2. Also formed in the body portion 60 of the mandrel 36 and extending forwardly and downwardly is a rib or back slot 64, which extends from the back to the front of the mandrel and opens at a medial region to the lower end of the breast or keel slot. The rearward region 65 of the rib or back slot 64 opens laterally entirely through the mandrel, while the forward, lower region 66 may be closed by an inner wall, core or insert 67. Also, a leg slot or groove 68 may extend from the lower, forward region of slot 64 generally diametrically or circumferentially of the mandrel, being provided with a recessed insert or bottom wall 69, for a purpose appearing more fully hereinafter.

Mounted on the mandrel 36, spaced below the leg slot 68, is a mounting bracket 70, having a forward extension 71 carrying a lateral pintle or hinge pin 72. A longitudinal arm 73 is pivotedly connected intermediate its ends to the hinge pin 72 for swinging movement about the axis thereof, and is provided on its upper or outer end with a pair of specifically configured pads 74 for firm clamping engagement with the breast of a poultry carcass 75 on the mandrel 36. Spaced outward of the breast clamping members or pads 74, there may be provided on the longitudinal arm 73 a guide member 76 having one edge 77 generally aligned with the breast slot 59 for guiding a breast blade into the slot.

Extending downwardly from the hinge pin 72, the lever or arm 73 may be provided with one or more cam followers or tracks 78 having an outer portion 79 and an inner portion 80 connected together by an offsetting portion 81.

The cross block 42 carries a forwardly extending arm 82, on the forward end of which is journaled one or more camming rollers 83. Upon up and down movement of the cross block 42 in the manner hereinbefore described, the camming rollers 83 will engage the outer portions 79 of track 78 to let the breast clamping pads 74 swing forwardly away from the mandrel 36; however, upon downward movement of cross block 42 and camming rollers 83 the latter will engage the inner track regions 80 to swing the breast clamps rearwardly into clamping relation with the mandrel, and specifically to clamping relation with the breast of a carcass carried by the mandrel. In this clamping condition, the breast clamp 74 and mandrel 36 are shiftable rearwardly, as will appear more fully hereinafter.

Mounted on the back wall 12, spaced over the support frame 13 and rearwardly of the mandrel 36 when the latter is in its forward position of FIG. 2, are a pair of rotary blades or wing cutters 85 carried by suitable spindles 86, in turn driven by appropriate motive means 87, which may be electrical, pneumatic, hydraulic or otherwise. The wing cutting assembly 85, 86, and 87 may be mounted to the back wall 12 by any suitable mounting members 88. Extending generally forwardly from the blade carrying members 87 may be a pair of wing engaging members or rods 89 arranged to engage the wings of a carcass and spread the same for more effective severance of the wings from the remainder of the carcass by the rotating wing cutting blades 85.

Figure 4:
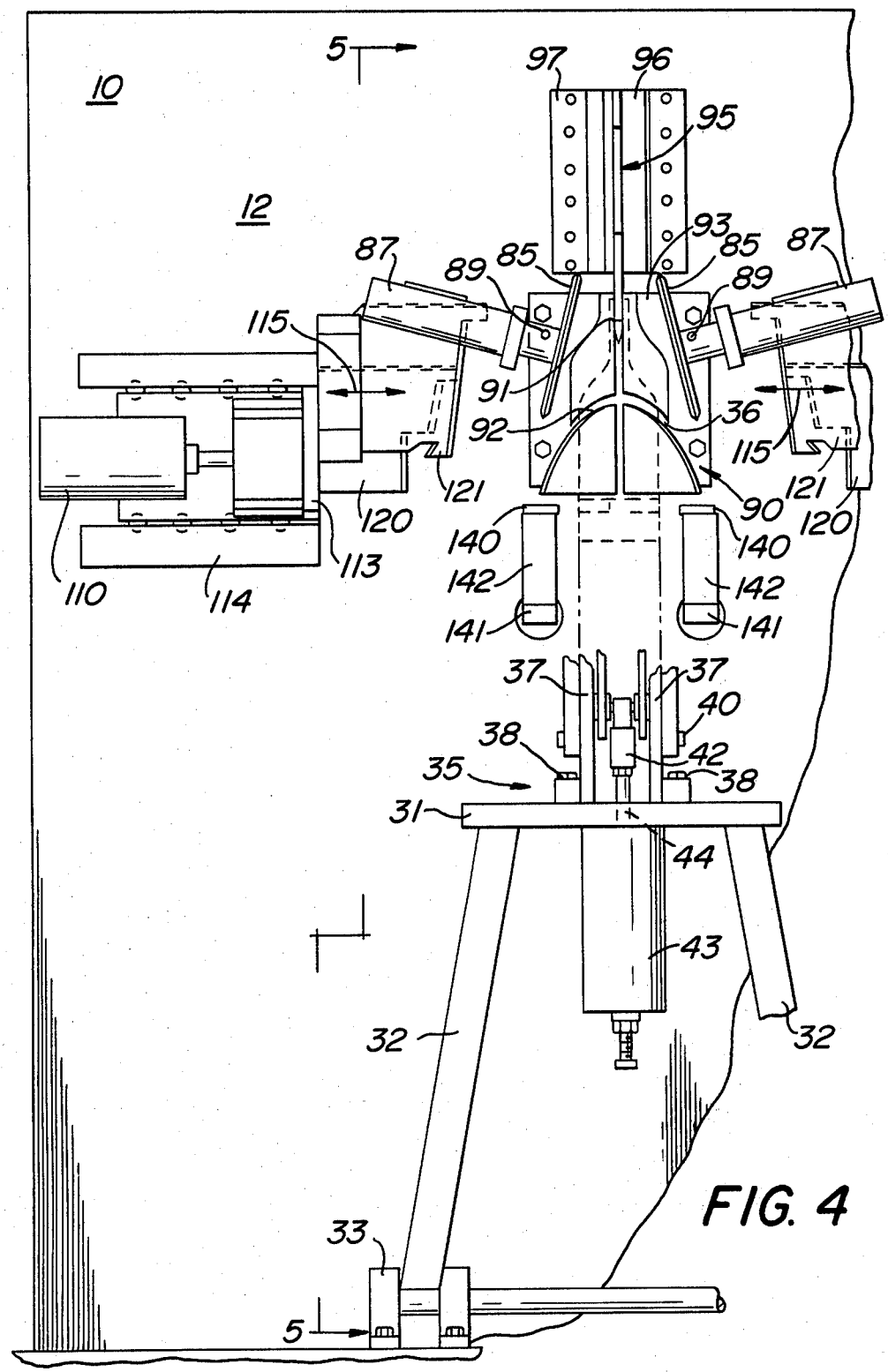
FIG. 4 is a partial front elevational view similar to FIG. 1, but drawn to a larger scale and with a mandrel in phantom to illustrate construction rearward of the mandrel.

Mounted on the rear wall 12, directly behind the mandrel 36 is a carcass receiver or back plate 90 suitably configured to conformably engage and receive the back of a carcass carried by the mandrel 36 when the latter is swung rearwardly to a home position against the back plate. Further, the back plate or socket 90 is formed with slots for receiving cutting blades, such as a vertical slot 91 shown in FIG. 4, and a downwardly and forwardly extending slot 92. The back plate or receiver 90 may be fixed to a mounting plate 93 which may in turn be secured in fixed relation to the back wall 12.

Also mounted on the back wall 12, generally directly above the back plate or receiver 90 is a generally vertical or splitting blade 95, mounted in a slide or carrier 96 carried by a vertical guide or slideway 97 suitably fixed to the back wall 12.

Figure 9:
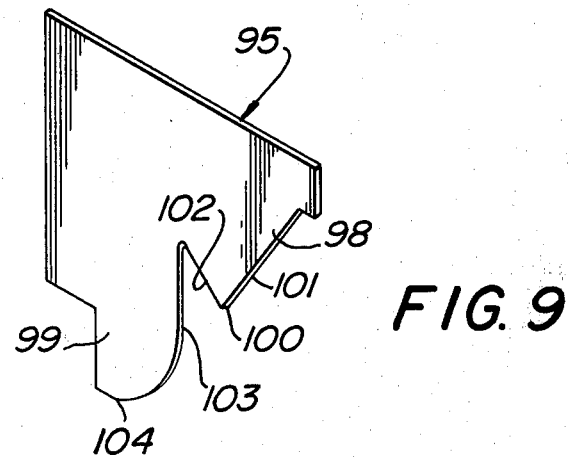
FIG. 9 is a perspective view showing an additional cutting blade of the present invention, apart from the remainder thereof.

The vertical or splitting blade 95 is best seen in FIGS. 2 and 9, where it will be seen to include a major upper part 98 from which depends a rearward part 99. The upper, forward part includes a depending point 100 defined between downwardly convergent cutting edges 101 and 102, and the depending rearward part being defined within a generally vertical, forwardly facing cutting edge 103 which merges smoothly with a downwardly facing lower cutting edge 104. Suitable operating means are provided for effecting vertical reciprocation of the knife 95 in properly timed relation, such means may be conventional and are not shown.

In operation, with the mandrel 36 at its rearmost position and a carcass on the mandrel engaged in the back wall or receiver 90, the vertical blade or splitter 95 is caused to move downwardly, which substantially completely cuts the carcass in half along its rear side and through the neck on its front side.

Figure 3:
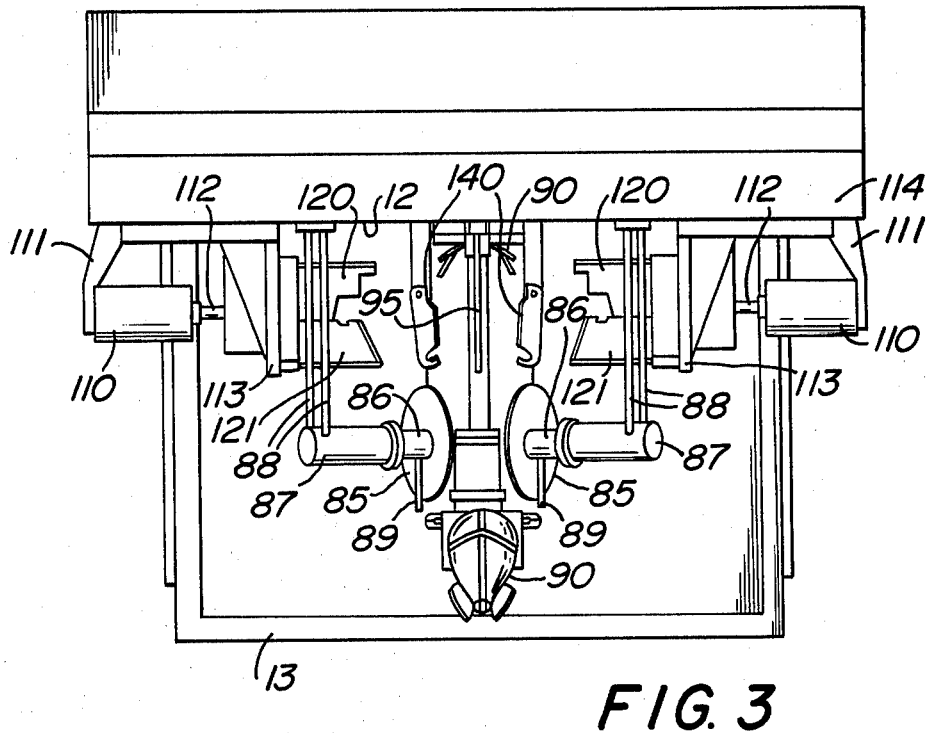
FIG. 3 is a top plan view of the apparatus of FIG. 1.

Also mounted on the back wall 12, on opposite sides of the back plate or receiver 90, may be a pair of generally horizontally disposed cylinder-and-piston assemblies 110. Each cylinder-and-piston assembly 110 may be fixed in position by a suitable mounting bracket 111, as best seen in FIG. 3, and piston rods 112 may extend laterally inwardly, in general alignment with each other, from respective assemblies. A cross head 113 is secured on the end of each piston rod 112 and may be guided by suitable guides or way means 114. The cross heads 113 are reciprocable in the directions of arrows 115 in FIG. 4, and each carry a pair of blades extending inwardly toward the blades of the other pair. More specifically, each cross head 113 carries a rib or back cutting blade 120 which inclines rearwardly, and a keel or breast cutting blade 121 which declines rearwardly toward and terminates proximate to a medial region of the adjacent rib or back cutting blade.

Figure 7:
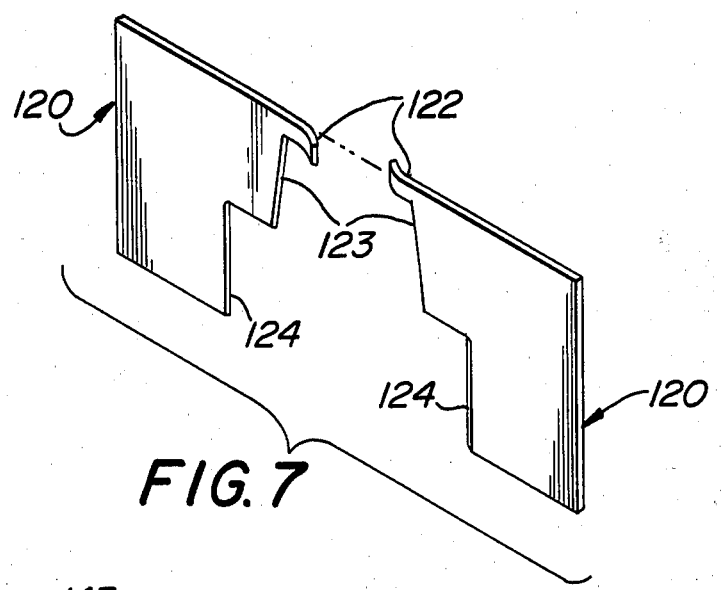
FIG. 7 is a perspective view showing an additional pair of shear action cutting blades of the present invention apart from the remainder of the apparatus.

The rib or back cutting blades 120 of respective cross heads 113, are substantially coplanar with each other, as in the perspective view of FIG. 7. It will there be seen that each rib or back cutting blade 120 includes along its upper edge a guide finger 122 for guiding and deflecting engagement with the guide finger of the other back or rib cutting blade 120. Proximate to and below each guide finger 122, the next adjacent upper edge region 123 defines a knife edge for scissors-like or shearing coaction with the edge portion 123 of the other blade 120. Thus, the deflecting fingers 122 assure that inward movement of the blades 120 toward each other will not result in abutting engagement, but assure a shearing action between the cutting edges 123 of the blades. This cutting action takes place in the upper region 64 of mandrel slot 63. The lower edges 124 of each blade 120 are offset away from each other and their adjacent shear action edge portions 123. Upon inward movement of blades 120, the lower blade portions 124 coact in die-cutting engagement with the inner or bottom wall 67 of the slot 63 to cut the lower ribs of the carcass.

Figure 6:
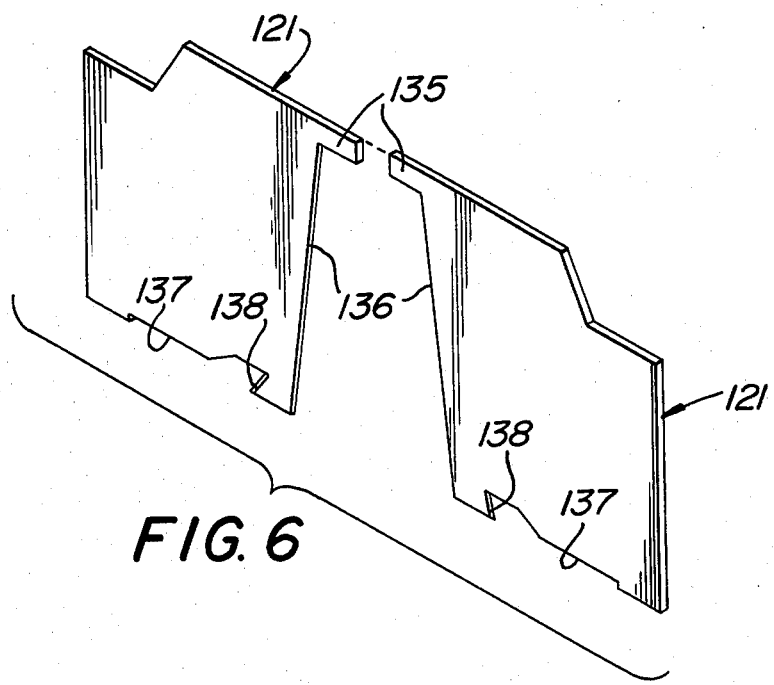
FIG. 6 is an exploded perspective view showing a pair of shear action cutting blades, apart from the remainder of the apparatus.

The breast or keel blades 121 are best shown in FIG. 6, and include along their upper edges a pair of deflection fingers or extensions 135, which may serve the same function as the fingers 122 of blades 120, but illustrate a different configuration. Extending downwardly from the fingers 135, the inner edges 136 of blades 121 may diverge slightly for improved scissor-like or shearing coaction, being suitably bevelled or sharpened toward this end. Thus, the keel or breast cutting blades pass through the keel or breast cutting slot 59, extending laterally completely there through in their shearing coaction for severing the breast of the carcass. Along the lower edges 137 of the breast cutting blades 121, there are formed undercut, oppositely, outwardly flacing knife edges 138. Upon retraction of the blades 121, the skin or uncut meat will engage the knife edges 138, and be severed thereby upon blade retraction.

Figure 8:
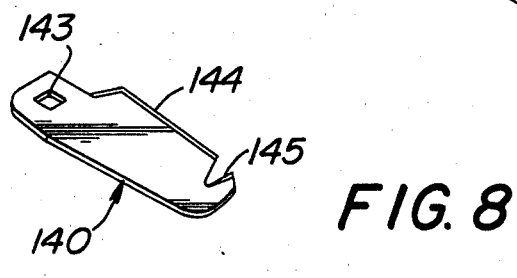
FIG. 8 is a perspective view showing a leg cutting blade of the present invention apart from the remainder thereof.

In addition, there are a pair of leg cutting blades 140 for cutting engagement with the carcass legs. The leg cutting blades 140 are each located on one side of the mandrel 36 when the latter is in its rearward position, below the cross heads 113 when the latter are shifted inwardly. A leg cutter mounting bracket 141 may extend generally forwardly from the back wall 12, and carry upstanding, rotary shaft or pin 142. Suitable actuating means (not shown) may be employed to effect rotation of each pin 142 approximately one quarter turn. On the upper end of each pin or shaft 142, nonrotatably carried thereby, is a respective leg cutting blade 140. As may be seen in FIG. 8, each leg cutting blade 140 may include a noncircular hole 143 for nonrotative engagement with its operating shaft 142. Along one longitudinal edge of each blade 140, as at 144 may be provided a cutting or knife edge; and, at the distal or outer end there may be provided a recessed cutting or knife edge 145 defining a hook-like cutting edge. With the mandrel in its rearmost position, the leg cutting blades 140 are actuated to swing inwardly for less than completely severing of the legs. That is, the leg cutter blades 140 are positively swung inwardly to sever the legs through the bone or joint, but to leave unsevered flesh or skin connecting the legs to the carcass. Upon return or forward mandrel movement, the leg blades in their cutting position catch with their internal hood edges 145 and sever the remaining flesh or skin to free the legs from the carcass.

OPERATION

While the operation is believed apparent from the foregoing description, it will be briefly reviewed.

With the gantry 30 swung forwardly to place the mandrel 36 in its forward position of FIG. 2 and the breast clamp 74 swung forwardly away from the mandrel, a carcass is placed on the mandrel with the breast forwardly. Upon downward actuation of the cross block 42, the leg pullers 50 close to grip a leg between each pair of jaws 51 and draw the leg downwardly, simultaneously swinging the breast clamp 74 into clamping relation with the breast of the carcass. In this condition, the gantry 30 is swung rearwardly, and initially upon rearward swinging movement the pins 89 engage beneath and spread the carcass wings to facilitate their removal upon continued rearward swinging movement past the wing cutting blades 85. The wings then fall gravitationally into the chute 16 and hopper 22. Upon continued rearward swinging movement of the mandrel 36 to place the mandrel mounted carcass in the rear carcass receiving plate 90, the vertical blade 95 is then caused to move downwardly and substantially split the carcass into two halves. However, by the joint cooperation of the mandrel, breast clamp, and rear plate receiver, the carcass is held together in position. The keel and rib blades are then moved inwardly to effect severance of the carcass into the breasts, backs and thighs, all of which are for the present, retained in position.

The leg blades 140 are then swung inwardly to effect the substantial, but incomplete severance.

The rib and keel blades, and splitting blade are withdrawn, and the mandrel 36 moved forwardly, to effect complete leg severance and release of the backs and thighs for gravitational falling to the chute 16 and hopper 22. The breast clamp is then released to permit gravitational falling of the breasts, and the legs are simultaneously released in the manner described hereinbefore.

Upon collection of sufficient number of parts, or weight, the hopper 22 may discharge parts to the bag 23. The bags may be desired to contain the parts of one or more birds, by control of the hopper 22 and trap door 24, all of which may be conventional.

Also, the various operating controls for the parts described hereinbefore may also be conventional so that their detailed description is not necessary.

Of course, if certain cuts are not desired, or if it is desired that an article of poultry by cut into more or less parts, there may be employed more or less cutters, without departing from the spirit of the invention.

From the foregoing, it is seen that the present invention provides a poultry cutting apparatus of the type described which is simple, durable, reliable, high in product output, and which otherwise fully accomplishes its intended objects.

Although the present invention has been described in some detail by way of illustration and example for purposes of clarity of understanding, it is understood that certain changes and modifications may be made within the spirit of the invention.

What is claimed is:

1. A poultry cutting apparatus comprising a poultry mandrel mounted for shifting movement along a path forwardly and rearwardly into and out of a forward carcass loading position, said mandrel having at least one slot facing laterally of said path, a clamp mounted for movement rearwardly and forwardly into and out of clamping relation with said mandrel and movable with said mandrel in clamping relation therewith for holding a carcass on the mandrel, forward cutting means at a forward region of said path for cutting of a carcass upon rearward mandrel movement, rearward cutting means at a rearward region of said path for movement into said one slot and cutting of said carcass, said carcass being released upon forward clamp movement away from and out of clamping relation with said mandrel, said one slot opening through said mandrel transversely of said path, said rearward cutting means comprising a pair of shear action blades mounted for extension into and retraction from said one mandrel slot and combining upon shearing action to pass entirely through said one mandrel slot, and die cutting portions on said shear action blades for die cutting coaction with said mandrel.

2. A poultry cutting apparatus comprising a poultry mandrel mounted for shifting movement along a path forwardly and rearwardly into and out of a forward carcass loading position, said mandrel having at least one slot facing laterally of said path, a clamp mounted for movement rearwardly and forwardly into and out of clamping relation with said mandrel and movable with said mandrel into clamping relation therewith for holding a carcass on the mandrel, forward cutting means at a forward region of said path for cutting of a carcass upon rearward mandrel movement, rearward cutting means at a rearward region of said path for movement into said one slot and cutting of said carcass, said carcass being released upon forward clamp movement away from and out of clamping relation with said mandrel, said one slot opening through said mandrel transversely of said path, said rearward cutting means comprising a pair of shear action blades mounted for extension into and retraction from said one mandrel slot and combining upon shearing action to pass entirely through said one mandrel slot, and undercut edges on said shear action blades for cutting carcass skin on retraction of said blades.

3. A poultry cutting apparatus comprising a poultry mandrel mounted for shifting movement along a path forwardly and rearwardly into and out of a forward carcass loading position, said mandrel having at least one slot facing laterally of said path, a clamp mounted for movement rearwardly and forwardly into and out of clamping relation with said mandrel and movable with said mandrel into clamping relation therewith for holding a carcass on the mandrel, forward cutting means at a forward region of said path for cutting of a carcass upon rearward mandrel movement, rearward cutting means at a rearward region of said path for movement into said one slot and cutting of said carcass, said carcass being released upon forward clamp movement away from and out of clamping relation with said mandrel, said one slot opening through said mandrel transversely of said path, said rearward cutting means comprising a pair of shear action blades mounted for extension into and retraction from said one mandrel slot and combining upon shearing action to pass entirely through said one mandrel slot, and die cutting portions on said shear action blades for die cutting coaction with said mandrel.

4. A poultry cutting apparatus comprising a poultry mandrel mounted for shifting movement along a path forwardly and rearwardly into and out of a forward carcass loading position, said mandrel having at least one slot facing laterally of said path, a clamp mounted for movement rearwardly and forwardly into and out of clamping relation with said mandrel and movable with said mandrel into clamping relation therewith for holding a carcass on the mandrel, forward cutting means at a forward region of said path for cutting of a carcass upon rearward mandrel movement, rearward cutting means at a rearward region of said path for movement into said one slot and cutting of said carcass, said carcass being released upon forward clamp movement away from and out of clamping relation with said mandrel, said one slot opening through said mandrel transversely of said path, said rearward cutting means comprising a pair of shear action blades mounted for extension into and retraction from said one mandrel slot and combining upon shearing action to pass entirely through said one mandrel slot, said one slot being on the forward side of said mandrel and extending rearwardly and downwardly just below the breast of a carcass on said mandrel, and said shear action blades declining rearwardly for breasst cutting movement into said one slot.

5. A poultry cutting apparatus according to claim 4, in combination with an outwardly facing undercut blade on each of said breast cutting blades for severing engagement with carcass skin on retraction from said shearing coaction.

6. A poultry cutting apparatus comprising a poultry mandrel mounted for shifting movement along a path forwardly and rearwardly into and out of a forward carcass loading position, said mandrel having at least one slot facing laterally of said path, a clamp mounted for movement rearwardly and forwardly into and out of clamping relation with said mandrel and movable with said mandrel into clamping relation therewith for holding a carcass on the mandrel, forward cutting means at a forward region of said path for cutting of a carcass upon rearward mandrel movement, rearward cutting means at a rearward region of said path for movement into said one slot and cutting of said carcass, said carcass being released upon forward clamp movement away from and out of clamping relation with said mandrel, said one slot opening through said mandrel transversely of said path, said rearward cutting means comprising a pair of shear action blades mounted for extension into and retraction from said one mandrel slot and combining upon shearing action to pass entirely through said one mandrel slot, said one slot being on the rear of said mandrel and extending forwardly and downwardly, the rearward region of said one slot extending entirely through said mandrel laterally thereof, the forward region of said one slot extending laterally into said mandrel and terminating in an inner wall, and said shear action blades including forward blade regions movable into said forward slot region in die cutting relation with said inner wall.

7. A poultry cutting apparatus comprising a poultry mandrel mounted for shifting movement along a path forwardly and rearwardly into and out of a forward carcass loading position, said mandrel having at least one slot facing laterally of said path, a clamp mounted for movement rearwardly and forwardly into and out of clamping relation with said mandrel and movable with said mandrel in clamping relation therewith for holding a carcass on the mandrel, forward cutting means at a forward region of said path for cutting of a carcass upon rearward mandrel movement, rearward cutting means at a rearward region of said path for movement into said on slot and cutting of said carcass, said carcass being released upon forward clamp movement away from and out of clamping relation with said mandrel, and clamp mounting means mounting said clamp for rearward swinging movement into said clamping relation and forward swinging movement out of said clamping relation, a puller mounted for downward and upward shifting movement away from and toward said mandrel for respectively pulling and releasing the leg of a carcass on said mandrel, and operating means interposed between said leg puller and clamp for effecting clamping and releasing by said clamp upon respective pulling and releasing by said puller.

8. A poultry cutting apparatus comprising a poultry mandrel mounted for shifting movement along path forwardly and rearwardly into and out of a forward carcass loading position, said mandrel having at least one slot facing laterally of said path, a clamp mounted for movement rearwardly and forwardly into and out of clamping relation with said mandrel and movable with said mandrel in clamping relation therewith for holding a carcass on the mandrel, forward cutting means at a forward region of said path for cutting of a carcass upon rearward mandrel movement, rearward cutting means at a rearward region of said path for movement into said one slot and cutting of said carcass, said carcass being released upon forward clamp movement away from and out of clamping relation with said mandrel, and leg puller means mounted for movement with said mandrel and downwardly and upwardly shifting movement away from and toward said mandrel for respectively pulling and releasing the leg of a carcass on said mandrel, and leg cutting means at a rearward region of said mandrel path and swingable into and out of severing engagement with the legs of a carcass.

9. A poultry cutting apparatus according to claim 8, in combination with hook means on said leg cutting means for severing engagement with the carcass on forward movement of the mandrel.

* * * * *